(12) United States Patent
Raghunath

(10) Patent No.: US 8,345,675 B1
(45) Date of Patent: Jan. 1, 2013

(54) ORDERLY OFFLINING IN A DISTRIBUTED, MULTI-STAGE SWITCH FABRIC ARCHITECTURE

(75) Inventor: Balakrishna Raghunath, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 206 days.

(21) Appl. No.: 12/980,099

(22) Filed: Dec. 28, 2010

(51) Int. Cl.
*H04L 12/50* (2006.01)
*H04Q 11/00* (2006.01)
(52) U.S. Cl. .......................... 370/388; 370/412
(58) Field of Classification Search .......... 370/387–388, 370/412–419
See application file for complete search history.

(56) References Cited

U.S. PATENT DOCUMENTS

| | | | |
|---|---|---|---|
| 7,406,038 B1 * | 7/2008 | Oelke et al. | 370/225 |
| 7,760,732 B2 * | 7/2010 | Bhargava et al. | 370/392 |
| 8,125,902 B2 * | 2/2012 | Rochon et al. | 370/230.1 |
| 8,175,086 B2 * | 5/2012 | Goodfellow et al. | 370/360 |
| 2003/0058793 A1 * | 3/2003 | Rochon et al. | 370/229 |
| 2003/0091035 A1 * | 5/2003 | Roy et al. | 370/353 |
| 2003/0200330 A1 * | 10/2003 | Oelke et al. | 709/238 |
| 2004/0257997 A1 * | 12/2004 | Loewen et al. | 370/235 |
| 2005/0073963 A1 * | 4/2005 | Goodfellow et al. | 370/255 |
| 2006/0221972 A1 * | 10/2006 | Bhargava et al. | 370/392 |
| 2008/0044181 A1 | 2/2008 | Sindhu | |
| 2008/0279106 A1 * | 11/2008 | Goodfellow et al. | 370/238 |

OTHER PUBLICATIONS

U.S. Appl. No. 12/618,536, by Sriram Raghunathan, filed Nov. 13, 2009.

* cited by examiner

*Primary Examiner* — Chuong T Ho
(74) *Attorney, Agent, or Firm* — Shumaker & Sieffert, P.A.

(57) ABSTRACT

A network device having a distributed, multi-stage forwarding architecture uses a two-stage process for planned orderly offlining of switch fabric components. The process includes a prepare stage in which preparations are made from downstream components to upstream components for offlining and new spray weights are calculated but not applied, and a commit stage in which new spray weights are committed and applied to traffic from upstream components to downstream components.

34 Claims, 10 Drawing Sheets

ORDERLY OFFLINING IN A DISTRIBUTED, MULTI-STAGE SWITCH FABRIC ARCHITECTURE

TECHNICAL FIELD

The disclosure relates to computer networks and, more particularly, to communicating packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

A variety of routers exist within the Internet. Network Service Providers (NSPs), for example, maintain "edge routers" to provide Internet access and other services to the customers. Examples of services that the NSP may provide include Voice over IP (VoIP), access for Asynchronous Transfer Mode (ATM) or frame relay communications, Internet protocol (IP) data services, and multimedia services, such as video streaming. The edge routers of the NSPs often communicate network traffic to high-speed "core routers," which may be generally viewed as forming the backbone of the Internet. These core routers often include substantially more processing resources than the edge routers, and are designed to handle high volumes of network traffic.

In some examples, a core router may employ a distributed, multi-stage switch fabric architecture, in which network packets traverse multiple stages of the switch fabric located in distributed forwarding components of the router to travel from an ingress point of to the switch fabric to an egress point of the switch fabric. As one example, a switch fabric may be implemented as a single multi-stage Clos switch fabric, which relays communications across the stages of the switch fabric. As another example, a switch fabric may be implemented as a number of parallel planes, one of which may be treated as a spare plane.

Individual components of the distributed, multi-stage switch fabric may be taken offline, a process referred to as "offlining," for various reasons such as to replace a component with a new component. When components are offlined while the core router continues to forward packets, packet loss may occur until a new component is installed and operational.

SUMMARY

In general, techniques are described for managing offlining of switch fabric components in a network device having a distributed, multi-stage forwarding architecture. When a fabric component such as a fabric link, fabric chip, fabric card, fabric chassis, or fabric cable is to be offlined, this will decrease available bandwidth to a destination along certain paths if the switch fabric. To account for this, the upstream fabric chips may need to spray proportionately less traffic to certain links of the fabric chips. The disclosure provides a two-stage process for planned orderly offlining of the switch fabric components. The process includes a prepare stage in which preparations are made from downstream components to upstream components for offlining and new spray weights are calculated but not applied, and a commit stage in which new spray weights are committed and applied to traffic from upstream components to downstream components. After the two stages are completed, the switch fabric components may be offlined without traffic loss.

As one example, the techniques may be applied in a distributed, multi-stage forwarding architecture having a central routing component and a plurality of distributed forwarding components, where each of the distributed forwarding components includes a dedicated central processing unit (CPU) that manages one or more fabric chips of that distributed forwarding component. The central routing component may include a fabric management module that communicates with fabric management modules of each of the CPUs to execute an offlining operation using the two-stage orderly process. In one aspect, a fabric management module associated with a fabric component to be offlined issues an offline request to the fabric management module of the routing component. The fabric management module of the routing component concurrently forwards the request along multiple paths in the upstream direction of the switch fabric. Each request may be identified by the path it has traversed so far.

In one example, a method of offlining a switching component within a routing system having a switch fabric in which a set of distributed switching components provide a plurality of paths between a set of ingresses and a set of egresses of the switch fabric is described. The method includes concurrently computing adjusted spray weights for each of the switching components positioned along multiple paths in an order from the switching component to be offlined to a plurality of the switching components coupled to the ingresses of the switch fabric, wherein the adjusted spray weights are respectively computed in order at each of the switching components along the respective path of the multiple paths, and wherein the adjusted spray weights control proportions of packets to be forwarded to outputs of the switching components. The method further includes applying the adjusted spray weights with the switching components along the multiple paths in a respective opposite order from the ingresses of the switch fabric to the switching component to be offlined, and switching packets through the switch fabric with the distributed switching components in accordance with the applied adjusted spray weights.

In another example, a routing system includes a switch fabric including a set of distributed switching components that provide a plurality of paths between a set of ingresses and a set of egresses of the switch fabric, and a plurality of CPUs, wherein each of the plurality of CPUs is associated with a respective plurality of the set of switching components. The CPUs concurrently compute adjusted spray weights for each of the switching components positioned along multiple paths in an order from the switching component to be offlined to a plurality of the switching components coupled to the ingresses of the switch fabric, and the adjusted spray weights are respectively computed in order at each of the switching components along the respective path of the multiple paths, and wherein the adjusted spray weights control proportions of packets to be forwarded to outputs of the switching components. The CPUs apply the adjusted spray weights with the switching components along the multiple paths in a respective opposite order from the ingresses of the switch fabric to the switching component to be offlined, and the distributed switching components switch packets through the switch fabric in accordance with the applied adjusted spray weights.

In a further example, a computer-readable storage medium of a routing system includes instructions for causing a programmable processor to send a series of offlining prepare messages to a plurality of distributed forwarding components of the routing system, wherein the series of offlining prepare messages are sent in response to a determination that a switching component of the routing system is to be offlined, wherein the plurality of distributed forwarding components lie along different paths within a switch fabric of the routing system to different switch fabric ingresses, wherein each of the paths extends through the switch fabric from one of the switch fabric ingresses to the switching component to be offlined. Each of the offlining prepare messages indicates that the distributed forwarding component receiving the offlining prepare message should, based on the switching component to be offlined, compute adjusted spray weights for the distributed forwarding component and store the adjusted spray weights without applying the adjusted spray weights, wherein the spray weights control proportions of packets to be forwarded to outputs of the switching components. The instructions further cause the programmable processor to send a series of commit messages from the routing component to the distributed forwarding components along each of the paths, wherein the commit messages indicate that the distributed forwarding components should apply the adjusted spray weights and begin forwarding traffic in accordance with the adjusted spray weights.

The techniques of this disclosure may provide one or more advantages. For example, the techniques may be used by a network device having a distributed, multi-stage forwarding architecture to reduce or eliminate packet loss during planned offlining of switch fabric components, even as the network device continues to forward traffic during an offlining operation. In addition, in architectures having multiple CPUs, an offlining operation may be concurrently handled over multiple upstream paths within the switch fabric from a source component being offlined. The techniques of this disclosure may also provide platform-independent fabric management. That is, the fabric management functionality is platform-independent and can be used with a variety of network device platforms.

The details of one or more examples are set forth in the accompanying drawings and the description below. Other features, objects, and advantages will be apparent from the description and drawings, and from the claims.

DETAILED DESCRIPTION

Figure 1:
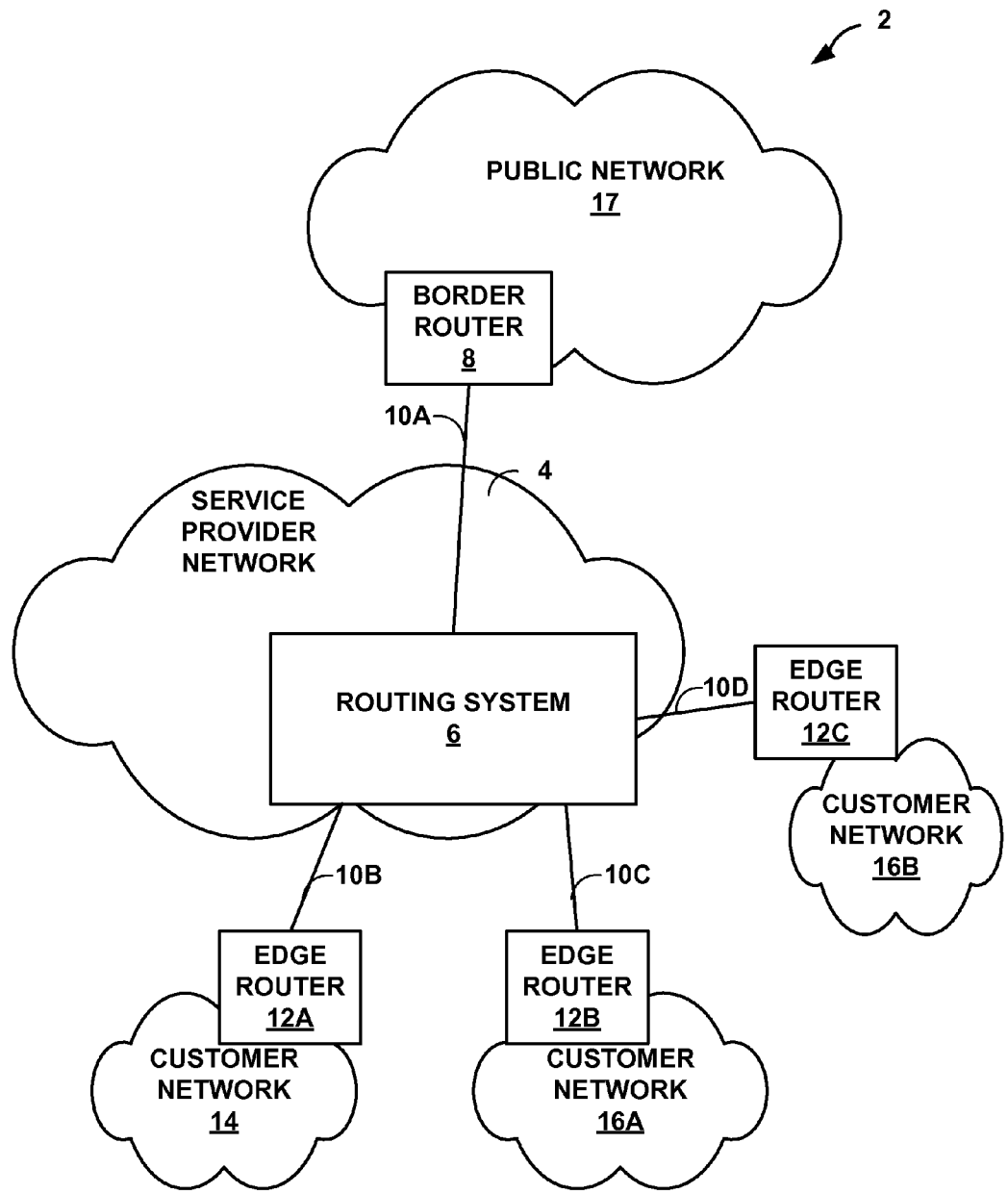
FIG. 1 is block diagram of an example computing environment in which a service-provider network includes a routing system that operates in accordance with the principles of this disclosure.

FIG. 1 is a block diagram illustrating an example network environment 2 in which service provider network 4 includes a routing system 6 that operates in accordance with the principles of this disclosure. For purposes of example, the techniques of the disclosure are described with respect to a simplified network environment 2 of FIG. 1. In this example, routing system 6 communicates with edge router 12A via link 10B to provide customer networks 14 access to public network 17, which may be a collection of backbone and other service provider networks. Similarly, routing system 6 communicates with edge routers 12B, 12C via links 10C, 10D to provide customer networks 16A, 16B access to public network 17, where customer networks 16A, 16B may, for example, be geographically separate networks associated with the same enterprise.

Routing system 6 may exchange routing information with edge routers 12A-12C (edge routers 12) to which they are coupled in order to maintain an accurate representation of the topology of network environment 2 and the respective customer networks 14, 16. Customer networks 14, 16 may include one or more computing devices (not shown), such as personal computers, laptop computers, handheld computers, workstations, servers, switches, printers, customer data centers or other devices. The configuration of network environment 2 illustrated in FIG. 1 is merely exemplary. For example, service provider network 6 may be coupled to any number of customer networks. Nonetheless, for ease of description, only customer networks 14, 16 are illustrated in FIG. 1.

In this way, service provider network 4 may form part of a large-scale public network infrastructure, e.g., the Internet. Consequently, customer networks 14, 16 may be viewed as edge networks of the Internet. Service provider network 4 may provide computing devices within customer networks 14, 16 with access to the Internet and may provide other network services. Examples of services that routing system 6 may provide include, for example, Voice over IP (VOIP), access for Asynchronous Transfer Mode (ATM) or frame relay communications, Internet protocol (IP) data services, and multimedia distribution services, such as video streaming. End users (not shown) within customer networks 14, 16 access routing system 6 with computing devices or other network-enabled devices. In some cases the end users may not be associated with large enterprises but instead may access service provider network 4 via cable modems, digital subscriber line (DSL) modems or other network access devices. In another example, service provider network 4 and routing system 6 may provide network services within the core of the Internet and may not be directly coupled to customer networks. In either case, service provider network 6 may include a variety of network devices (not shown) other than routing system 6 and edge routers 12, such as additional routers, switches, servers, or other devices.

In one example aspect, routing system 6 may be a multi-router system that includes one or more stand-alone routers that have been partitioned into multiple protected system domains (PSDs) that operate as independent logical routers. In this example, each of the PSD logical routers operates and participates as a different standalone router within network environment 2. Each of the PSD logical routers, for example, participates in separate routing sessions with other routers to exchange routing information and maintain separate forwarding information.

In another example aspect, routing system 6 may be a multi-chassis router that may consist of a plurality of hierarchically arranged cooperative routing components operating as a single node within service provider network 4. In one example, the multi-chassis router includes a switch card chassis (SCC) that operates as a control node and one or more line card chassis (LCCs) that operate as packet routing devices. The LCCs may contain all the physical interfaces for coupling to other devices within service provider network 4, while the SCC controls and routes traffic between the LCCs.

In accordance with the techniques described herein, routing system 6 includes a distributed, multi-stage switch fabric architecture, in which network packets traverse multiple stages of a switch fabric located in distributed forwarding components of the router to travel from an ingress point of to the switch fabric to an egress point of the switch fabric. As one example, a switch fabric of routing system 6 may be implemented as a number of parallel planes, one of which may be treated as a spare plane. As another example, a switch fabric of routing system 6 may be implemented as a single multi-stage Clos switch fabric, which relays communications across the stages of the switch fabric. For example, routing system may include a multi-stage switch fabric, such as a 3-stage or 5-stage Clos switch fabric, that relays communications between the routing nodes via optical interconnects using multiplexed communications. Such a multi-chassis router that employs optical interconnects using multiplexed communications is described in U.S. Publication No. 2008/0044181, entitled MULTI-CHASSIS ROUTER WITH MULTIPLEXED OPTICAL INTERCONNECTS, filed on Aug. 1, 2007, the entire contents of which are incorporated by reference herein.

Routing system 6 is configured to manage an orderly process for offlining components of the distributed, multi-stage forwarding architecture, so as to avoid packet loss due to the offlining. For example, routing system 6 may employ a two-step process for offlining switch fabric components. The two-step process includes a prepare stage, in which an offline prepare request is sent to switch fabric components "upstream" (i.e., in a direction against the flow of data packets through the switch fabric) of the switch fabric component being offlined, and a commit stage, in which a commit message is sent to switch fabric components in an upstream-to-downstream direction. Components being offlined using this process may include, for example, fabric chips, fabric links, fabric chassis, fabric cards, and fabric cables. A chassis is a collection of cards, and each card consists of fabric chips interconnected by links.

During the prepare stage, a separate routing component of the routing system 6 manages the transmission of the offline prepare request to a central processing unit (CPU) of each of the upstream switch fabric components. Each of plurality of upstream switch fabric component CPUs concurrently processes the offline prepare requests, and calculates modified switch fabric spray weights that are adjusted in view of the switch fabric component to be offlined. The CPUs record the modified switch fabric spray weights, but do not commit the modified spray weights until later receiving a commit message indicating that all upstream switch fabric components have committed their new spray weights.

After each switch fabric component CPU upstream of the switch fabric component to be offlined has calculated the modified switch fabric spray weights, the commit stage begins. The routing component manages orderly transmission of commit messages to the switch fabric component CPUs to cause the CPUs to apply the modified switch fabric spray weights to the switch fabric components. When all of the commit messages corresponding to a given offline operation arrive back at the switch fabric component to be offlined, the offline operation is complete and the switch fabric component can be removed without packet loss.

Figure 2:
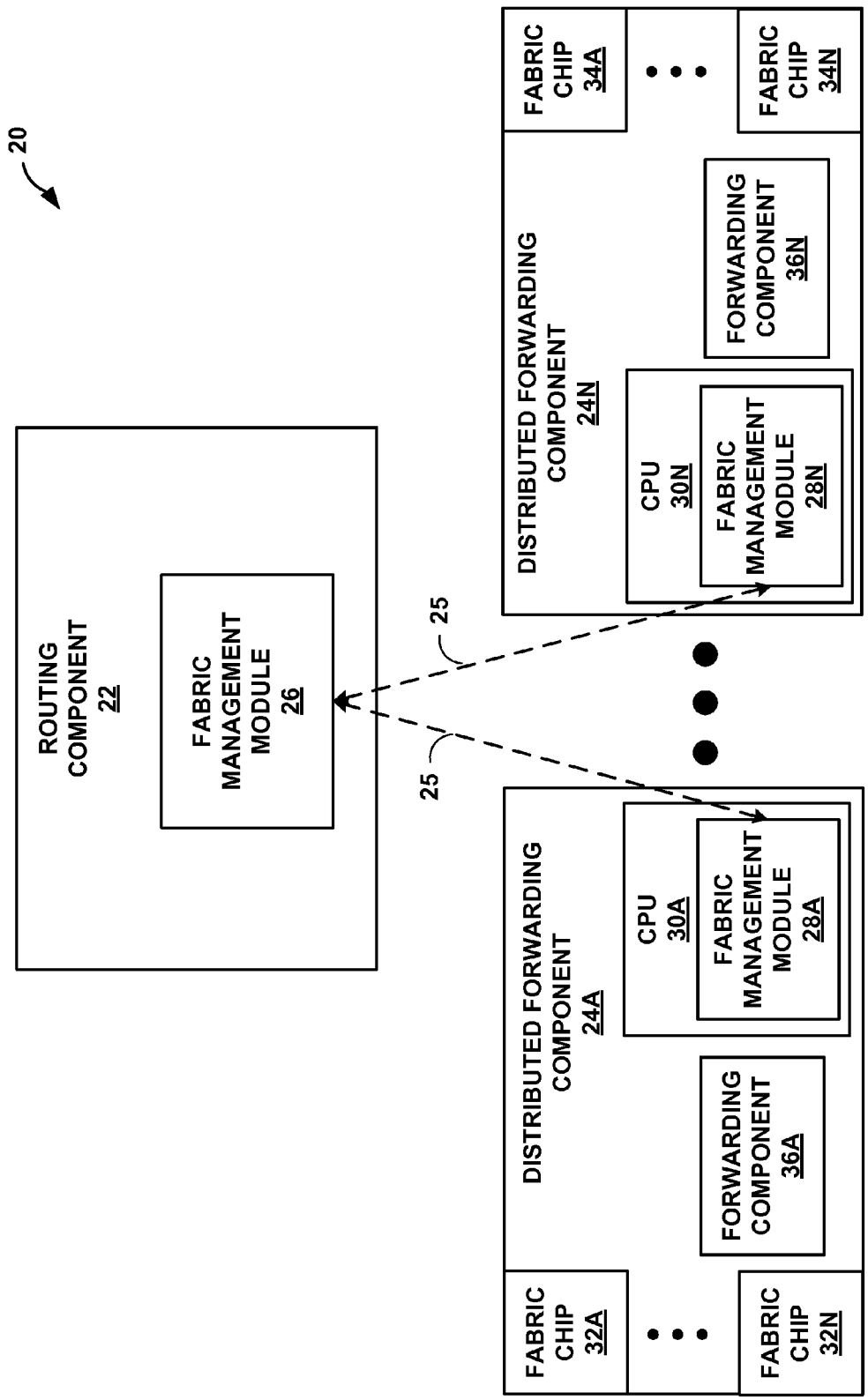
FIG. 2 is a block diagram illustrating example components of a routing system.

FIG. 2 is a block diagram illustrating example components of a routing system 20 that performs orderly offlining of switch fabric components consistent with the techniques of this disclosure. In this example, the routing system 20 includes routing component 22 and distributed forwarding components 24A-24N ("distributed forwarding components 24"). Routing component 22 includes a fabric management module 26 in communication with fabric management modules 28A-28N ("fabric management modules 28") via control signals 25.

Routing component 22 also maintains routing information that describes a topology of a network, and derives a forwarding information base (FIB) (not shown) in accordance with the routing information. Routing component 22 copies the FIB to each of distributed forwarding components 24. An ingress one of forwarding components 36A-36N uses the FIB to direct data arriving from the network (not shown) to the proper egress forwarding components (also any forwarding component from forwarding components 36). The egress forwarding component 36 relays the data as data packets to the network, such as by determining a next hop for data packets using the FIB provided by routing component 22.

Distributed forwarding component 24A includes a central processing unit (CPU) 30A that provides an operating environment for fabric management module 28A. Distributed forwarding components 24 may each comprise a "CPU domain," which is the set of fabric chips that a given CPU 30 controls. Fabric chips 32A-32N ("fabric chips 32") and fabric chips 34A-34N ("fabric chips 34") may form portions of a distributed, multi-stage switch fabric of routing system 20. Fabric management module 28A manages operation of fabric chips 32 in forwarding network packets through the distributed, multi-stage switch fabric. Likewise, fabric management module 28N of CPU 30N manages operation of fabric chips 34. For example, fabric management modules 28 initiate calculation of spray weights, i.e., weights that control how much data to a given fabric destination is sprayed on each of the links associated with the fabric chips. Fabric management modules 28 may program the fabric chips 32, 34 with the calculated spray weights. Both of fabric management modules 28 communicate with fabric management module 26 of routing component 22 via control signals 25. As described in further detail below, fabric management modules 26, 28, exchange prepare messages and commit messages during a controlled, orderly process for offlining fabric components such as fabric chips 32, 34. The prepare and commit messages may be out-of-band Ethernet messages, and each of distributed forwarding components 24 and routing component 22 may be addressable by an internal Media Access Control (MAC) address.

Figure 3:
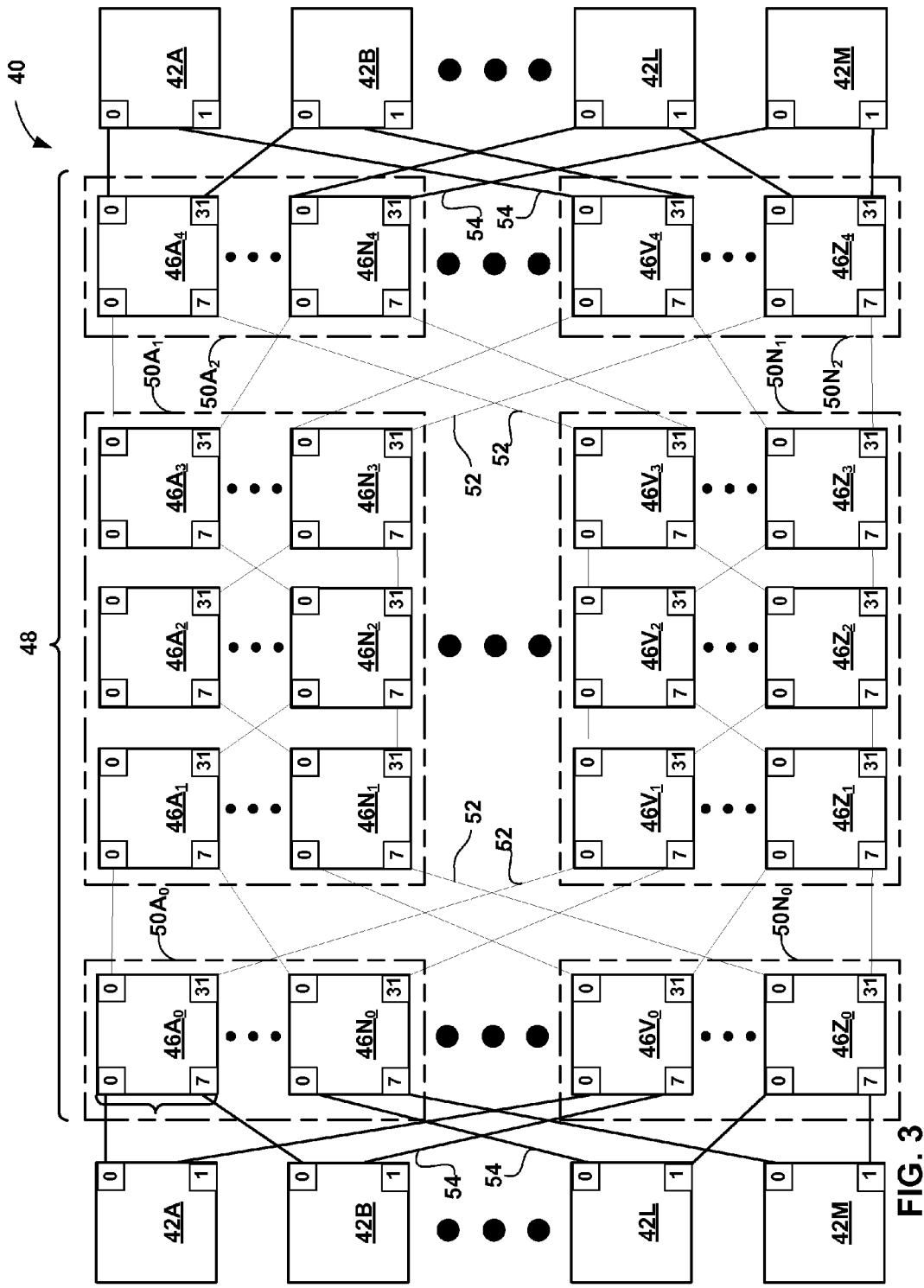
FIG. 3 is a block diagram illustrating a logical diagram of a forwarding plane that includes distributed, multi-stage switch fabric components.

FIG. 3 is a block diagram illustrating a logical diagram of an example forwarding plane 40 of a routing system that includes distributed, multi-stage switch fabric components. For example, forwarding plane 40 may be a portion of routing systems such as routing systems 6 and 20 of FIGS. 1 and 2, respectively. Forwarding planes include queuing chips 42A-42M ("queuing chips 42") which may reside in line cards of the routing system (not shown). Queuing chips 42 are coupled to a subset of fabric chips $46A_0$-$46Z_4$ ("fabric chips 46") via connections 52, and queuing chips 42 serve as input or output points for data being transmitted to or from switch fabric 48. Queuing chips 42A-42M are represented both on the left-hand side and the right-hand side of FIG. 3, to illustrate that the same set of queuing chips 42A-42M may serve as the input points and output points for switch fabric 48.

In the example of FIG. 3, fabric chips 46 are arranged in a five-stage Clos switch fabric architecture. Each of the five stages is represented by one of subscripts 0-4 used to label fabric chips 46. In some cases, a subset of the enumerated fabric chips 46, such as fabric chips $46A_0$-$46N_0$ and fabric chips $46V_0$-$46Z_0$, may be reused in each of the five stages. In the example of FIG. 3, chassis $50A_0$-$50N_2$ (chassis 50) are associated with particular fabric chips. The chassis 50 may include a plurality of slots for holding cards, each card consisting of fabric chips. Each of chassis 50 may have an associated CPU that controls the fabric chips associated with that chassis. In the example of FIG. 3, each of chassis 50 may coincide with a CPU domain, in that the set of fabric chips that a given CPU 30 controls are contained within a single chassis 50.

An administrator of the routing system in which forwarding plane 40 is included may wish to remove a fabric component such as one of fabric chips 46 from forwarding plane 40, e.g., to replace the fabric chip with a different one. Removal of a fabric chip or otherwise taking a fabric chip offline is referred to herein as "offlining" the fabric chip. In accordance with the techniques of this disclosure, the routing system follows an orderly process for offlining fabric chips 46. The administrator may trigger a start to the offlining operation in various ways. For example, the administrator may log in to the routing system and issue a software command that initiates offlining of one of fabric chips 46 or a link connected to the fabric chip 46. As another example, the administrator may employ a hardware trigger mechanism, such as by pushing an offlining button on a card within one of chassis 50. In response to receiving the software or hardware trigger, the CPU associated with the fabric chip or link being offlined sends an offline message to a routing component of the routing system. The routing component outputs an offlining prepare message to the CPU that sent the offline message, instructing the CPU to recalculate the spray weights for the fabric chips in the chassis in view of the offlining operation.

Figure 4:
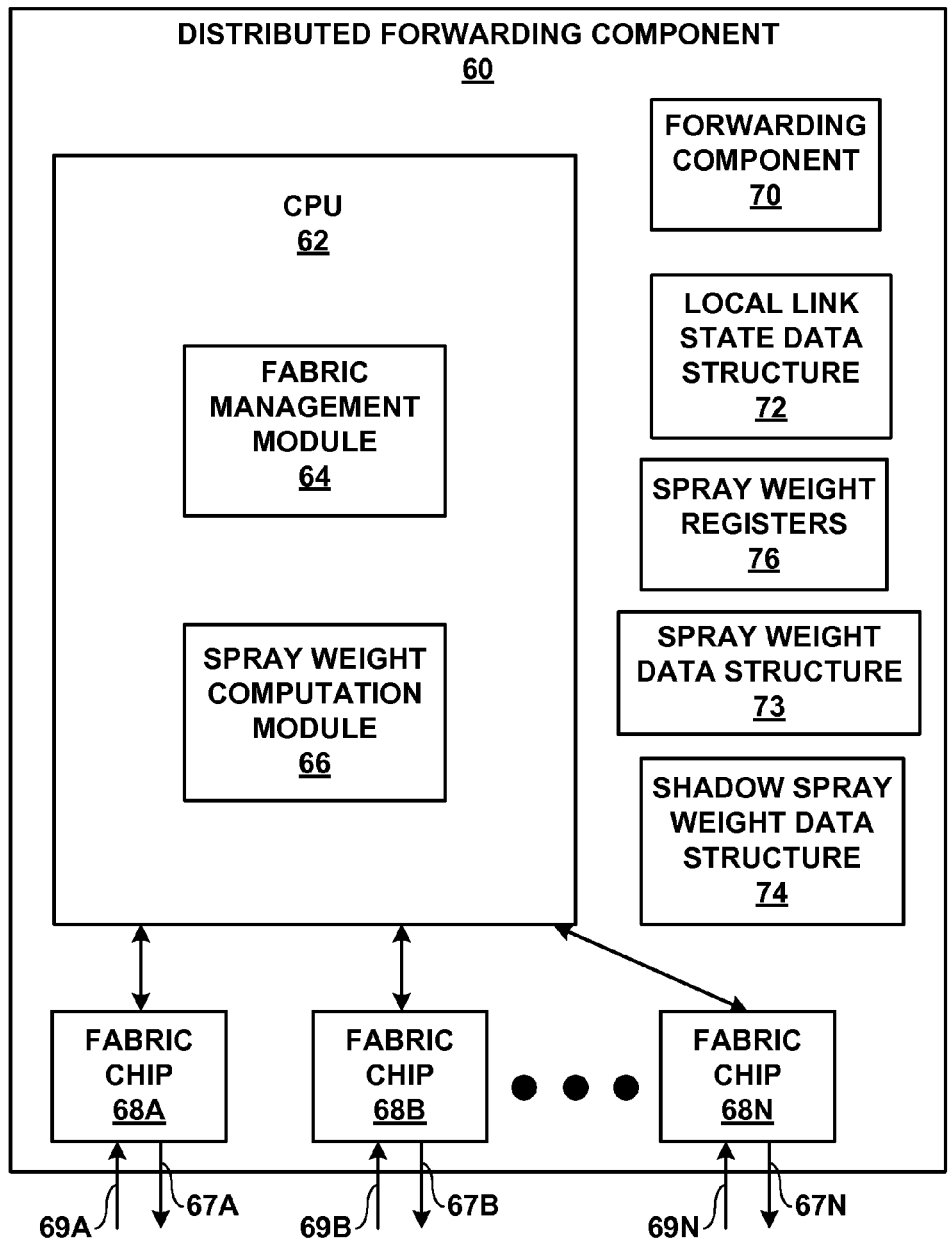
FIG. 4 is a block diagram illustrating an example distributed forwarding component in further detail.

FIG. 4 is a block diagram illustrating an example distributed forwarding component 60 in further detail. Distributed forwarding component 60 may be a distributed forwarding component such as one of distributed forwarding components 24 of FIG. 2. Distributed forwarding component 60 includes a CPU 62 having a fabric management module 64, and also includes a forwarding component 70 that manages data forwarding of data to or from ingress or egress ones of fabric chips 68A-68N ("fabric chips 68").

Fabric management module 64 discovers link state associated with fabric chips 68A-68N ("fabric chips 68"), such as by periodic polling of fabric chips 68 and/or polling upon events of interest. A CPU associated with each end of the link responds with a "hello" message that advertises, for example, its chip-id and port number. Fabric management module 64 receives the hello messages from the fabric chips 68 and stores the data in local link state data structure 72. Fabric management module 64 may send link state messages to fabric management module 86 in response to status requests from fabric management module 86. Fabric management module 64 may also send messages indicating local fabric events to fabric management module 86 of routing component 80 (FIG. 5), which updates global topology data structure 96 based on the local fabric events. Local link state data structure 72 includes state for the set of all links immediately upstream or immediately downstream from all of the fabric chips 68 managed by CPU 62. In some aspects, fabric management module 64 may send entity-level events rather than individual link state, and the receiver can then compute the topology based on the chassis type associated with the entity.

Fabric management module 64 keeps track of spray weights for each destination on each output link on each of fabric chips 68 in spray weight data structure 73, and the values present in spray weight data structure 73 are written to spray weight registers 76 which actually controls the spray rates that are applied. For example, when link state messages are received at distributed forwarding component 60 with updated topology information, spray rate computation module 66 calculates the necessary modifications to the spray rates and updates spray weight data structure 73, and the updated spray rates are written to spray rate registers 76. In one aspect, distributed forwarding component 60 maintains a fabric chip table indexed by chip ID, which points at spray weight data structure 73 for each fabric chip that is a table of spray weights for each destination as applicable on a given fabric chip. A destination mask may be specified that indicates if the destination is enabled at all. In one example implementation, each entry in spray weight data structure 73 may have 64 fields that indicate the spray weight for that destination on the corresponding link. The $j^{th}$ field of the $i^{th}$ entry indicates what proportion of the traffic to destination i should be sprayed on egress link j. The value may range from 0 (no spray) to some maximum value that is implementation specific. A link in the fabric may be uniquely identified by a pair of (chip-ID, port-ID) tuples, indicating these IDs for each end of the link.

When a link in the switch fabric is brought up or down, the available bandwidth to a fabric destination is affected. If the available bandwidth to a destination from a fabric chip along a particular output link decreases, it is desired to spray proportionately less to that link. In an unplanned error situation, fabric management module 64 may just recompute the sprays and apply the recomputed spray weights immediately to minimize packet drops. In contrast, in the case of a planned offlining operation, an orderly offlining process is followed as described herein. Fabric management module 64 may send an offline request message or an online request message to fabric management module 86 of routing component 80 in the event that fabric management module 64 becomes aware of a need to bring a line card, chassis, fabric card, or fabric bundle offline or online. Fabric management module 64 also receives fabric event messages relayed by fabric management module 86 of routing component 80 from other distributed forwarding components of a routing system. For example, fabric management module 64 may receive offlining prepare messages that indicate a line card, chassis, fabric card, or fabric bundle associated with a downstream forwarding component is to be offlined.

Spray weight computation module 66 recalculates new spray weights for each of the links associated with fabric chips 68 in view of the offlining prepare message, and fabric management module 64 updates shadow spray weight data structure 74 to record the new spray weights. Fabric management module 64 does not immediately apply the new spray weights to spray weight registers 76, which control the actual spray weights being currently implemented by fabric chips 68. Rather, fabric management module 64 maintains the new spray weights in shadow spray weight data structure 74 without applying them until a corresponding offlining commit message is received from routing component 80. When the offlining commit message is received that corresponds to the offlining prepare message, fabric management module 64 transfers the new spray weight values from shadow spray weight data structure 74 to spray weight data structure 73, writes the new spray weight values to spray weight registers 76, and begins spraying data in accordance with the new spray weight values. Fabric management module 64 also sends a message to fabric management module 86 of routing component 80 indicating that the new spray weights have been committed. Fabric management module 64 may interface with a driver associated with distributed forwarding component 60 (not shown) to adjust the spray weights on the fabric chips for a specified destination by indicating the chip-id, the destination-id, and the weight.

In one example implementation, spray weight computation module 66 recomputes spray weights upon a link event as follows:

```
recompute_spray (link, online)
{
    Extract { (src_chip, src_port), (dst_chip, dst_port) } from link
    if (dst_chip is an Endpoint Queuing Chip (TQ)) {
        if (online) {
            mask = 1
            weight = 100
            max links to destination = 1
        } else {
            mask = 0
            weight = 0
        }
        /*
        * Recursively propagate the spray weight upstream
        */
        propagate_spray(src_chip, src_port, dest, mask, weight,
            max links)
    } else {
        /*
        * There may be multiple destinations this link is applicable
        * to
        */
        for (each destination, dest) {
            if (online) {
                dw = &dst_chip->spray_weights_and_mask[dest]
                mask = dw->dest_mask
                weight = dw->cumulative_weight
                max_links = dw->max_links_to_dest
            } else {
                mask = 0
                weight = 0
            }
            /*
            * Recursively propagate the spray weight/Enable destination
            * upstream
            */
            propagate_spray(src_chip, src_port, dest, mask, weight,
                max_links)
        }
    }
}
propagate_spray (src_chip, src_port, dest, mask, weight, max_links)
{
    /* Recompute weight on the src_port of the src_chip */
    sw = &src_chip.spray_weights_and_mask[dest]
    prev_weight = sw->spray_weights[src_port]
    if (mask) {
```

```
    /*
    * Set the weight to the sum of all weights at the next stage
    * divided by the maximum number of links at the next stage
    * to the destination.
    * Example:
    * If there are maximum 4 links to possibly reach destination
    * and if only 3 of them have weight of 100 and the fourth
    * has a weight of 0, the value computed will be 300/4 i.e., 75
    */
    Enable bit for src_port on src_chip.dest_mask[dest]
    sw->spray_weights[sport] = weight / max_links;
} else {
    Disable bit for src_port on src_chip.dest_mask[dest]
    sw->spray_weights[src_port] = 0
}
/*
* Now recompute cumulative weight at this stage
*/
sw->cumulative_weight = sw->cumulative_weight - prev_weight +
    sw->spray_weights[src_port]
if (there has been a change in weight) {
    Program the hardware.
} else {
    return
}
/* Done if we have reached an Endpoint Queuing Chip (TQ)*/
if (src_chip is an Endpoint Queuing Chip (TQ)) {
    return
}
/*
* Otherwise, recursively move up and recompute spray
*/
for (each incoming port in source chip ) {
    if (this port is not connected) {
        continue;
    }
    Extract upstream chip, port from link
    if (the upstream chip is not local) {
        /*
        * We will send the upstream CPU the changes in
        * our spray table and the computation will proceed from
        * there on that CPU.
        */
        continue;
    }
    propagate_spray(upstream chip, upstream port, dest,
        sw->dest_mask, sw->cumulative_weight,
        sw->max_links_to_dest)
}
}
```

Local link state data structure 72 and shadow spray weight data structure 74 may each comprise one or more data structures arranged as tables, trees, link lists, databases, flat files, and other data structures.

Figure 5:
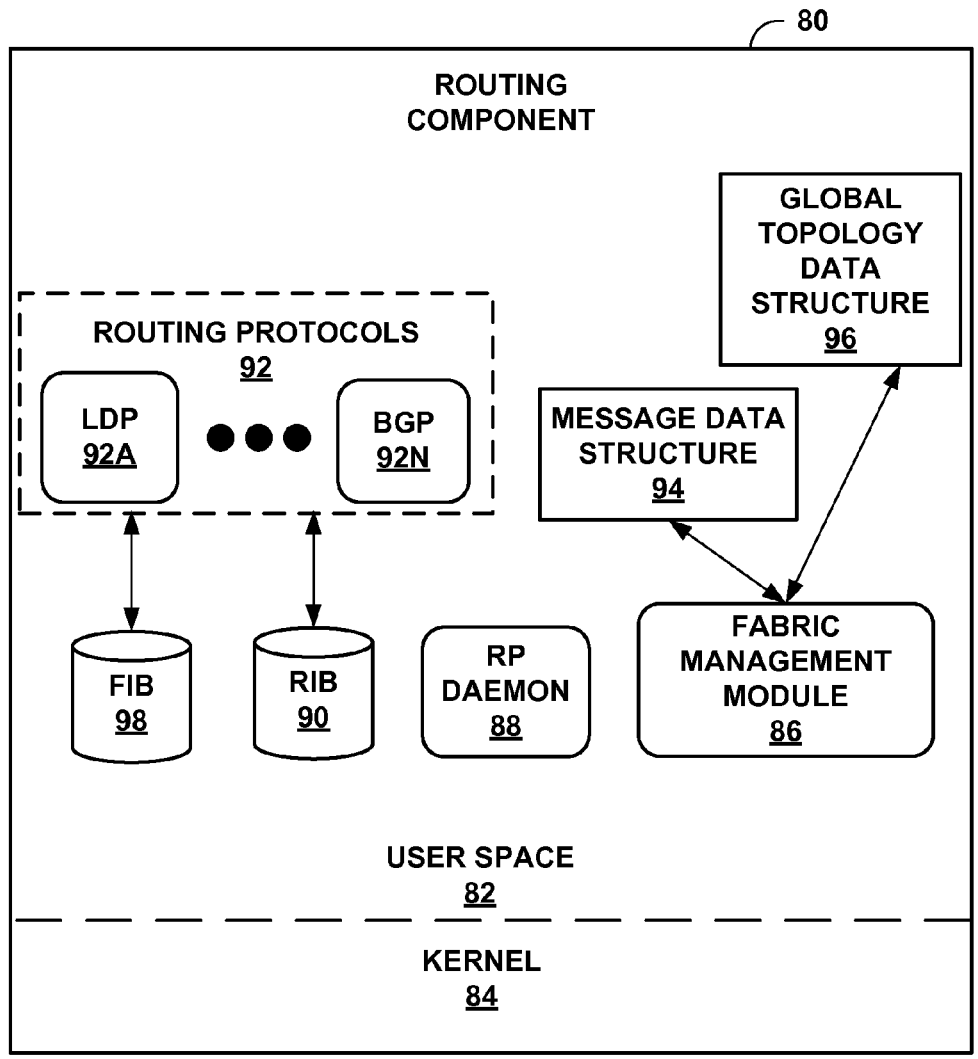
FIG. 5 is a block diagram illustrating an example routing component in further detail.

FIG. 5 is a block diagram illustrating an example routing component 80 in further detail. Routing component 80 may be a routing component such as routing component 22 of FIG. 2. Routing component 80 provides an operating environment that includes a user space 82 and a kernel space 84. Kernel space 84 may include an operating system that provides a multi-tasking operating environment for execution of a number of concurrent processes within user space 82. An example of such an operating system is FreeBSD, which is an advanced UNIX operating system that is compatible with a number of programmable processors, including commercially available processors. User space 82 includes software for presenting a fabric management module 86, a routing protocol (RP) daemon 88 that provides an interface to routing information base (RIB) 90, and a plurality of protocols 92 that implement specific network routing protocols. In the example of FIG. 4, protocols 92 include LDP 92A and BGP 92N. In other embodiments, protocols 92 may include additional protocols not shown, and user space 82 may comprise other daemons or software modules not shown.

RP daemon 88 of routing engine 126 provides an interface by which routing protocols 92 update RIB 90. Although routing protocols 92 are shown separately from RP daemon 89, the routing protocols may be implemented as one or more threads within RP daemon 88. RIB 90 contains route data that describes various routes through the network, and also next hop data indicating appropriate neighboring devices within the network for each of the routes. In response to network topology changes received from protocols 92, RP daemon 88 updates the routing information to accurately reflect the current network topology. RP daemon 88 may generate a forwarding information base (FIB) 98 based on RIB 90. In some aspects, RP daemon 88 may communicate with CPU 62 of distributed forwarding component 60 to install a FIB within distributed forwarding component 60.

Fabric management module 86 manages switch fabric related tasks, while the routing protocols 92 and RP daemon 88 handle routing functions. In this manner, functionality is split between (1) protocols 92 and RP daemon 88 which handle routing functions, and (2) fabric management module 86 which manages switch fabric related tasks, such as offlining switch fabric elements. Within routing component 80, fabric management module 86 is responsible for managing communications with distributed forwarding components, such as with CPU 62 of distributed forwarding component 60. These communications may include topology messages that indicate switch fabric topology information, offlining prepare messages and offlining commit messages that convey modified spray weights and commands for committing the modified spray weights, and other messages.

Fabric management module 86 may send periodic link state status requests to the fabric management modules 64 of distributed forwarding components 60, and fabric management module 86 updates global topology data structure 96 based on the link state messages received from the fabric management modules 64 of each of the distributed forwarding components 60. Fabric management module 86 also updates global topology data structure 96 based on messages from fabric management module 64 indicating local fabric events. Global topology data structure 96 includes topology information for each of the plurality of distributed forwarding components in the routing system, including internal spray weights and information about how the different distributed forwarding components are positioned with respect to one another. In contrast, each of the individual distributed forwarding components 64 may maintain only local topology information that may be considered a subset of global topology data structure 96. Message data structure 94 and global topology data structure 96 may each comprise one or more data structures arranged as tables, trees, link lists, databases, flat files, and other data structures.

Fabric management module 86 may also relay messages from fabric management module 64 indicating local fabric events (i.e., link state update messages) to distributed forwarding components upstream of the component the event was received from. Fabric management module 86 refers to global topology data structure 96 to determine which distributed forwarding components are upstream, i.e., which distributed forwarding components to relay the messages to. As used herein, the term "upstream" refers to the opposite direction as the flow of data in the distributed, multi-stage switch fabric, and the term "downstream" refers to the same direction as the flow of data in the distributed switch fabric. Fabric management module 86 can send the link state update messages in parallel to multiple distributed forwarding components in the upstream direction. After the immediately-upstream distributed forwarding components have acknowledged receipt of the messages, then fabric management module 86 continues relaying the messages to the next most upstream distributed forwarding components.

Fabric management module 64 of distributed forwarding component 60 may send an offline request message or an online request message to fabric management module 86 of routing component 80 in the event that fabric management module 64 becomes aware of a need to offline or online a line card, chassis, fabric card, or fabric bundle needs to be offlined or onlined, respectively. In response to receiving an offline or online request message, fabric management module 86 sends an offlining prepare message to the requesting distributed forwarding component 60, and upon receiving acknowledgement from the requesting distributed forwarding component, relays the offlining prepare message in parallel to all upstream distributed forwarding components. Fabric management module 86 refers to global topology data structure 96 to determine which distributed forwarding components are upstream, i.e., distributed forwarding components to which to relay the messages.

An upstream "run" during an offline operation is a traversal upstream from a starting point to compute spray weights. A starting point is the first fabric chip 68 encountered during an upstream run. At any given point in the run, the run is identified by the string of identifiers of inter-CPU domain fabric chip 68 that have been traversed in the upstream direction to reach that point. For example, referring to FIG. 3, when an offline operation is in progress for offlining fabric chip $46Z_4$, one example upstream run for this offline operation may be identified as follows: $46Z_4$, $46N_3$, $46A_1$, $46N_0$.

Fabric management module 86 may save information received in the offlining prepare messages to message data structure 94. Fabric management module 86 also records within the offlining prepare messages the run path that the message has taken so far through the fabric chips 68, based on the path information indicated by fabric management module 86. That is, the offlining prepare messages carry an indication of a chip-id of fabric chips 68 that the messages have already traversed. In this manner, the unique paths recorded in the offlining prepare messages allow fabric management module 86 to uniquely identify the paths and keep track of each path as offlining prepare messages are sent in parallel to different upstream forwarding components. An example format of an offlining prepare message is described in further detail below with respect to FIG. 6. The fabric management module 86 correlates the offlining commit message with the appropriate offlining prepare message when keeping track of which runs have recalculated spray weights that have been committed.

Figure 6:
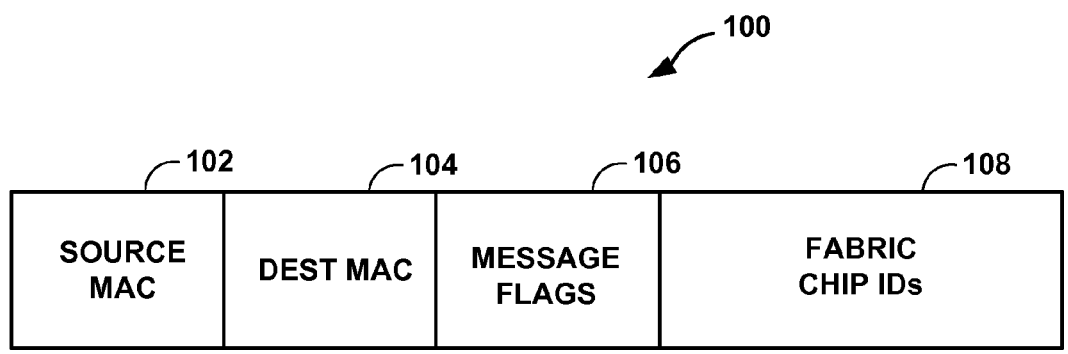
FIG. 6 is a block diagram illustrating an example format of a message sent between a routing component and a distributed forwarding component of a routing system.

FIG. 6 is a block diagram illustrating an example format of an example offlining prepare message 100 sent between a routing component and a distributed forwarding component of a routing system, such as between routing component 80 and distributed forwarding component 60 (FIGS. 4 and 5). Offlining prepare message 100 includes a source MAC field 102 that specifies a source MAC address of a component that is the source of the message, and a destination MAC field 104 ("DEST MAC 104") that specifies a destination MAC address of a component that is the destination of the message. Offlining prepare message 100 also includes a message flags field 106 containing flags that may indicate the nature of the message, e.g., specifying the message as an offlining prepare message for an offlining operation. Offlining prepare message 100 also includes a fabric chip identifiers (IDs) field 108 that is used by routing component 80 to record the identifiers of the fabric chips 68 of the run path associated with the message.

In one example aspect, fabric management module 86 receives a message from fabric management module 64 of distributed forwarding component 60 that indicates the identifiers of the inter-CPU domain fabric chips 68 associated with the CPU 62. Prior to outputting the offlining prepare message 100 to fabric management module 64 of distributed forwarding component 60, fabric management module 86 of routing component 80 records the identifiers of the fabric chips 68 to fabric chip IDs field 108. Offlining prepare message 100 may be, for example, an Ethernet packet sent via an out-of-band Ethernet connection established between routing component 80 and distributed forwarding component 60 for exchanging fabric management messages.

Figure 7A:
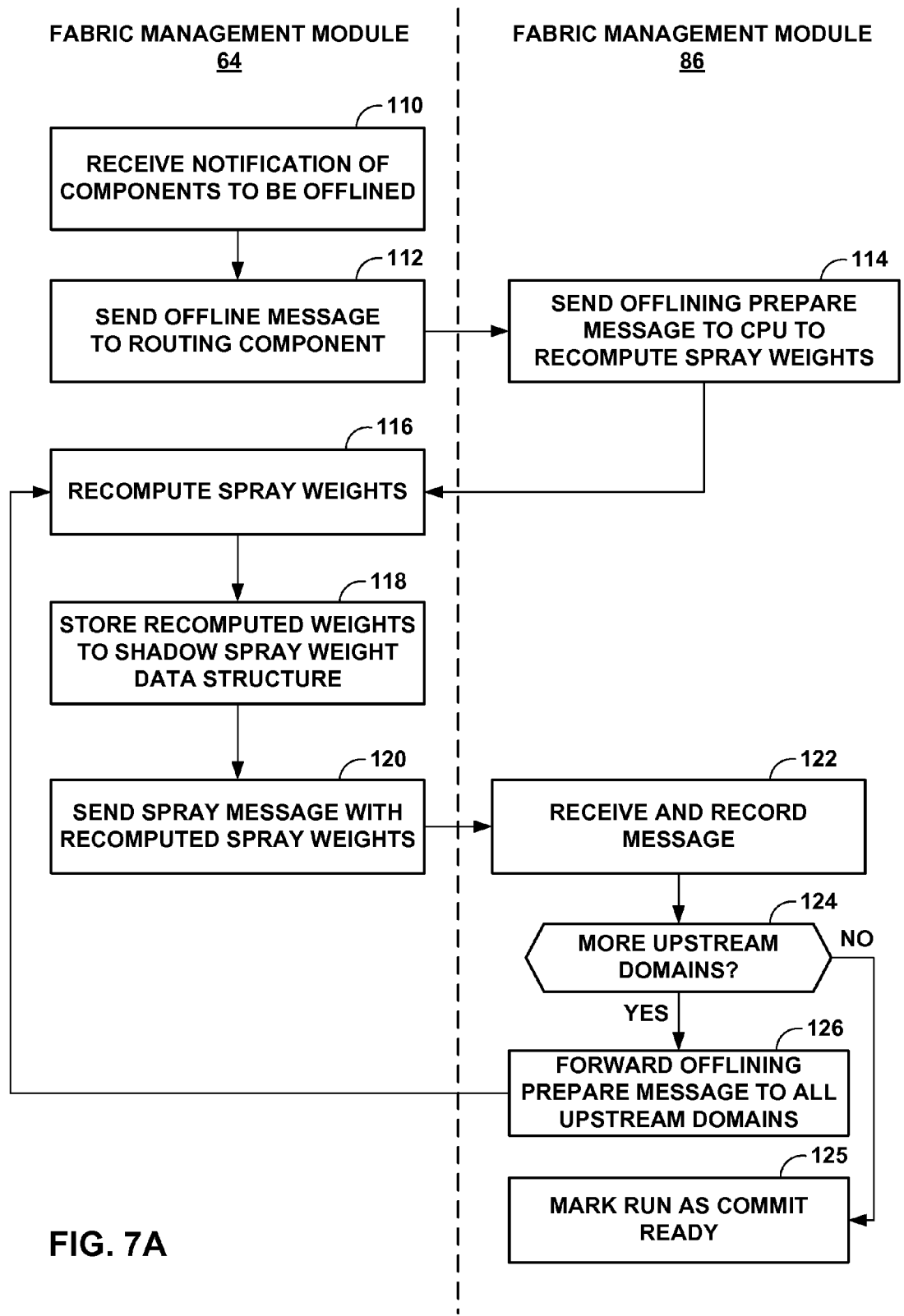
FIGS. 7A-7B are flowcharts illustrating an example offline operation consistent with the techniques of the disclosure.
Figure 7B:
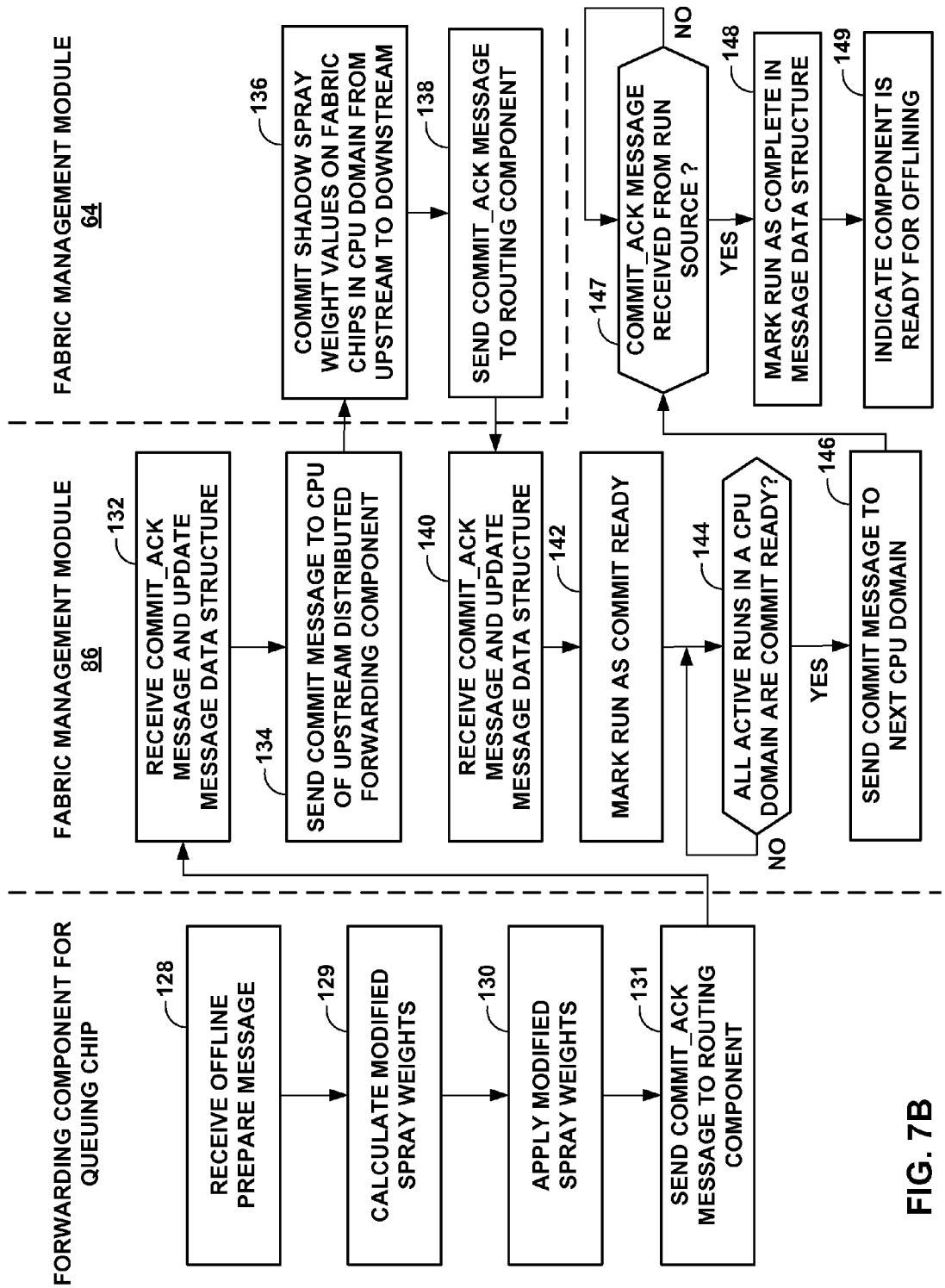

FIGS. 7A-7B are flowcharts illustrating an example offline operation consistent with the techniques of the disclosure. FIGS. 7A-7B will be described for purposes of example with respect to FIGS. 4 and 5. In the example of FIG. 7A, fabric management module 64 receives notification of fabric components to be offlined (110). For example, a link in the switch fabric, a fabric chip, a fabric card, or a fabric chassis may be chosen to be offlined, e.g., by an administrator. In response to the notification of fabric components to be offlined, fabric management module 64 sends an offline message to fabric management module 86 of routing component 80 (112). In one example aspect, fabric management module 86 sends an offlining prepare message to fabric management module 64 of the same distributed forwarding component, triggering recomputation of spray weights in view of the component to be offlined (114).

Spray weight computation module 66 recalculates new spray weights in offline-prepare mode for each of the links associated with fabric chips 68 in the domain of CPU 62 in view of the component being offlined as indicated in offlining prepare message (116). The spray weight recalculation is recursively propagated upstream in the CPU domain until it reaches an upstream chip. In the offline-prepare mode, fabric management module 64 updates shadow spray weight data structure 74 to record the new spray weights (118), but does not yet apply the new spray weights to spray weight registers 76.

Fabric management module 64 sends a message to fabric management module 86 indicating the recomputed spray weights (120). In one aspect, fabric management module 64 takes the difference of the spray weights on the upstream-most fabric chips before and after the latest update, and sends the delta of the spray weights as a spray message to fabric management module 86. Fabric management module 86 may record the recomputed spray weights in global topology data structure 96 (122), and may record information in message data structure 94. The spray message may include an offline flag to indicate that the spray weights are computed in offline-prepare mode as part of an offlining operation. When fabric management module 86 receives the spray message having an offline flag, fabric management module 86 searches message data structure 94 to locate the run associated with the spray message, and updates the run to add a chip-id to the run in the message. If there is no run created in message data structure 94 yet, fabric management module 86 creates the run. Fabric management module 86 marks the run as being in "offline prepare" mode or "offline commit" mode depending on where in the process the run is, as indicated by flags in the message.

In an alternative example aspect, fabric management module 64 invokes spray weight computation module 66 to recalculate the spray weights prior to sending the offline message to fabric management module 86, and fabric management module 86 proceeds to add the run information to the offline message and send the message to the next upstream CPU as an offlining prepare message (rather than sending the offlining prepare message back to the originating CPU).

Fabric management module 86 determines whether there are additional upstream CPU domains to which to propagate the offlining prepare messages (124), as determined by the fabric cables attached to the CPU domain from which fabric management module 86 received the spray message, e.g., by referring to global topology data structure 96. If there are more upstream CPU domains to which to send offlining prepare messages (YES branch of 124), fabric management module 86 forwards the spray message as an offlining prepare message to each upstream CPU domain (126). The forwarded offlining prepare messages indicate the changes to the spray weights in the immediate downstream fabric chips for the offlining preparation. A fabric management module 64 of an upstream CPU domain receives the offlining prepare message and spray weight computation module 66 continues the spray weight computations for that CPU domain based on the received changes to the spray weights in the immediate downstream fabric chips (116). This process continues until there are no further upstream CPU domains to which to send an offlining prepare message (NO branch of 124). When fabric management module 86 determines that there are no more upstream cables to which to propagate the offline prepare messages (NO branch of 124), fabric management module 86 marks the run as "commit ready" in message data structure 94 (125).

Referring to FIG. 7B, when an offlining prepare message is received at a source queuing chip 42 (FIG. 3) (128), a forwarding component 36 (FIG. 2) associated with the queuing chip 42 calculates modified spray weights based on the spray weights for the downstream chips as indicated in the offlining prepare message (129), applies the modified spray weights after computation such that data is now sprayed according to the modified spray weights (130), and sends a commit acknowledgment message ("Commit_ACK") to fabric management module 86 of routing component 80, indicating that the run is ready for the commit phase (131).

Fabric management module 86 receives the commit acknowledgment message from the forwarding component, accesses message data structure 94 to locate the entry associated with the offlining prepare message that corresponds to the received commit acknowledgement message, and updates the located entry to indicate that the run for this entry is commit ready (132). Fabric management module 86 also sends a commit message to the CPU 62 of the most upstream distributed forwarding component associated with the run, indicating that the shadow spray weights for the run are ready to be committed (134). Fabric management module 86 may determine the distributed forwarding component to which to send the commit message by referencing global topology data structure 96.

In response to receiving the commit message, fabric management module 64 commits the values stored in shadow spray weight data structure 74 to spray weight registers 76 for the run associated with the commit message (136). For example, fabric management module 64 may begin with the most upstream fabric chips 68 and recursively traverse the fabric chips 68 in the downstream direction to apply the shadow spray weight values to spray weight registers 76. Upon spray weight registers 76 being updated with the modified spray weights from shadow spray weight data structure 74, the fabric chip 68 begins processing data in accordance with the modified spray weights. When all the shadow spray weight values for the run have been committed and applied in the CPU domain, fabric management module 64 sends a commit acknowledgment message ("Commit_ACK") to fabric management module 86 of routing component 80, indicating that the run has been committed in the CPU domain (138).

Fabric management module 86 receives the commit acknowledgment message from the fabric management module 64, accesses message data structure 94 to locate the entry associated with the offlining prepare message that corresponds to the received commit acknowledgement message (140), and updates the located entry to indicate that the run for this entry is commit ready for the next most upstream CPU domain associated with fabric management module 64 (142). If all active runs in the next most upstream CPU domain are marked as commit ready (144), fabric management module 86 sends a commit message to the fabric management module 64 of the next most upstream CPU domain (146). If fabric management module 86 has received a commit acknowledgment message from the source of the run (YES branch of 147), fabric management module 86 marks the run as complete in message data structure 94 (148), and provides an indication to the administrator that the fabric component associated with the run is ready for offlining (149). The fabric component may be, for example, a line card, a chassis, a fabric card, a fabric chip, a fabric link, or a fabric bundle. Fabric management module 86 may provide the indication to the administrator via a user interface, indicator light, or other indication means.

If there are multiple concurrent offlining runs, these can proceed with their computations in parallel, but the shadow spray weights in a CPU domain may only be committed after all the relevant upstream CPU domains have committed for all of the concurrent runs. In some aspects, for a chassis offline operation the offline operation may be initiated by fabric management module 86 of routing component 80.

Figure 8:
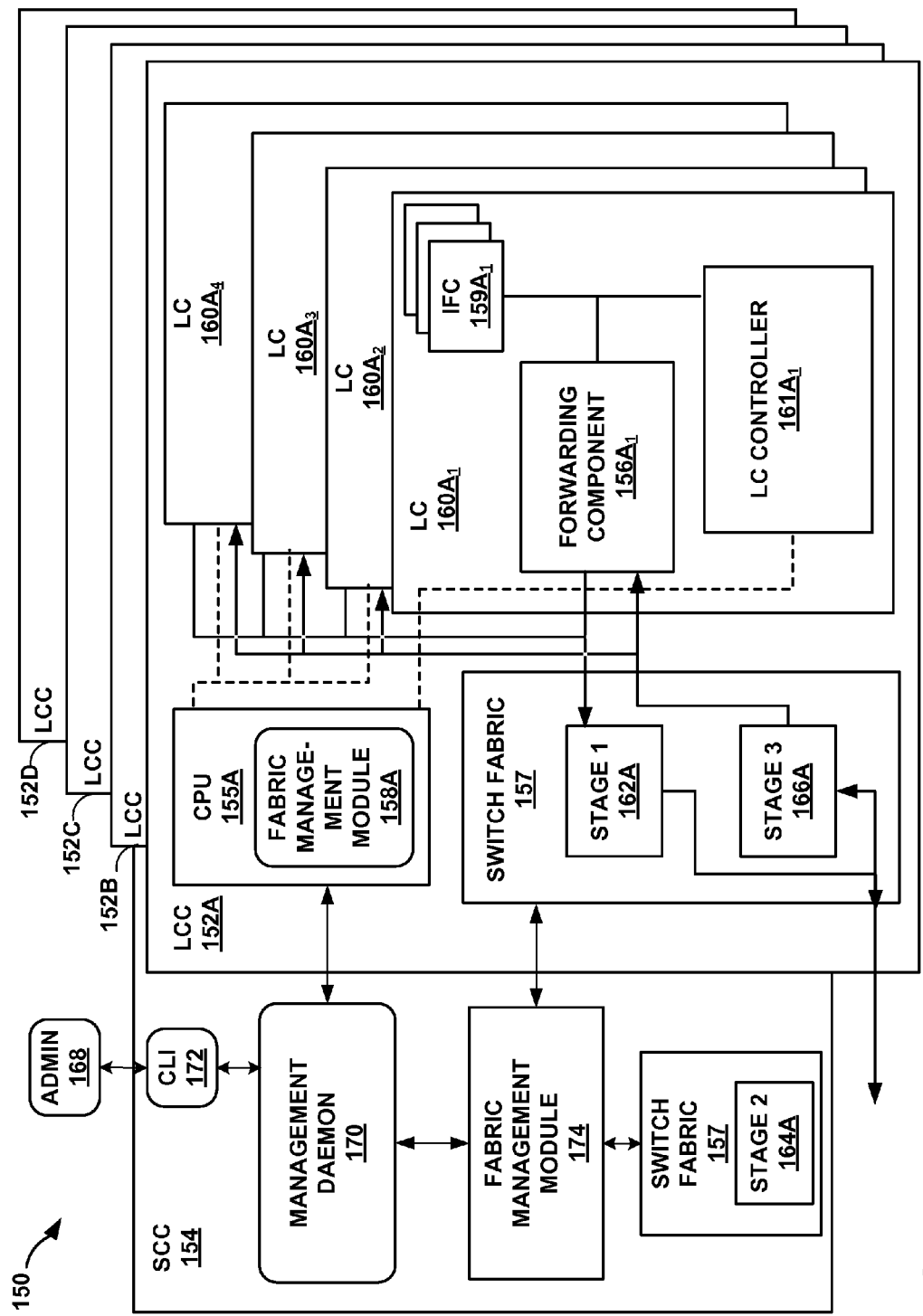
FIG. 8 is a block diagram illustrating an exemplary control plane of a multi-chassis router according to one aspect of the disclosure.

FIG. 8 is a block diagram illustrating an exemplary control plane of a multi-chassis router 150 according to one aspect of the disclosure. The techniques described above for orderly offlining of switch fabric components in a multi-stage switch fabric may be implemented in the multi-chassis router 150 of FIG. 8. In the example of FIG. 8, multi-chassis router 150 includes a detailed view of a line card chassis (LCC) 152A, which represents one routing node of the multi-chassis router 150. Multi-chassis router 150 routes data between network devices across a network. Multi-chassis router 150 may, for example, represent an illustration of routing system 6 of FIG. 1 in further detail.

As shown in FIG. 8, multi-chassis router 150 includes a plurality of cooperative routing components operating as a single node within the network. In this example, multi-chassis router 150 comprises four substantially identical LCCs 152B-152D ("LCCs 152") and a switch card chassis (SCC) 154. In other embodiments, a multi-chassis router may include more or fewer LCCs. SCC 154 may operate as a central routing node to connect the LCCs 152.

Each of LCCs 152 may be contained within a physically separate chassis and may include a CPU (only CPU 155A of LCC 152A is shown) having a fabric management module (only fabric management module 158A of LCC 152A is shown), switch fabric (only switch fabric 157 of LCC 152A is shown), a forwarding component set (only forwarding component 156A$_1$ of LCC 152A is shown), and a set of network interfaces (not shown). SCC 154 comprises a centralized routing engine (not shown) connected to each of the CPUs 155 of the LCCs 152 via links (not shown).

The other routing nodes, i.e., LCCs 152B-152D, are typically similar to LCC 152A. In this example, LCC 152A includes CPU 155A and four line cards (LCs) 160A$_1$-160A$_4$ ("LCs 160A"). Each LC 160A within LCC 152A includes a forwarding component. Each LC 160A further comprises a set of interface cards (IFCs) 159A that provide physical interfaces for receiving and sending packet-based data and/or circuit-based data to an external network (only IFC 159A$_1$ is shown). LCs 160A each also include an LC controller 161A (only LC controller 161A$_1$ is shown) that performs control functions within an LC 160A according to instructions from CPU 155A.

In multi-chassis router 150, each switch plane may be viewed as a multi-stage switch-plane that is distributed over a multi-chassis switch card from each of LCC switch fabrics 157 and an SCC switch card from SCC switch fabric 157. In other words, each multi-chassis switch card in switch fabrics 157 performs the beginning and final stages in a multi-stage switching network. For example, multi-chassis cards in switch fabrics 157 of LCCs 152 may perform the first and third stages (stage one 162A and stage three 166A are shown in FIG. 8), while switch cards in switch fabric 157 of SCC 154 perform the second stage of a three-stage network (stage two 164A are shown in FIG. 8). Together, one multi-chassis switch card from each of LCCs 152 and one SCC switch card from SCC 154 form a switch plane. For example, SCC switch fabric 157 and LCC switch fabrics 157 may form a total of five independent switch planes. In this manner, multi-chassis router 150 may comprise five independent switch planes, each one providing a multi-stage switched interconnect for forwarding packet cells between forwarding components. Multi-chassis router 150 may consist of multiple active switch planes and additional redundant switch plane(s) to serve as hot spares. For example, multi-chassis router 150 may consist of four active switch planes and one redundant switch plane.

In this embodiment, each multi-chassis switch card in LCC switch fabrics 157 is connected to a single switch card in SCC switch fabric 157. A separate link connects each SCC switch card to each multi-chassis switch card. For example, links (not shown) may consist of five fiber-optic array cables. If multi-chassis router 150 has five switch planes, for example, a total of twenty cables may be used to connect switch fabrics 157.

In one embodiment, administrator 168 ("ADMIN 168") interacts with management daemon 170 of SCC 154 via a command line interface (CLI) 172 to perform various management tasks using management daemon 170. In one example, the administrator 168 may interact with management daemon 170 to indicate that a particular component of switch fabric 157 should be offlined, thereby triggering an offline operation managed by fabric management modules 174, 158A.

The techniques described above for orderly offlining of switch fabric components in a distributed, multi-stage switch fabric may be implemented in multi-chassis router 150 of FIG. 8. For example, fabric management module 174 of SCC 154 may communicate with fabric management modules 158 of LCCs 152 to exchange offlining prepare messages and commit messages for the two-stage orderly offlining process described above. In some aspects, an LCC 152 may be offlined. Intra-chassis link messages may be propagated to upstream CPUs for the upstream CPUs to do new spray computation.

Figure 9:
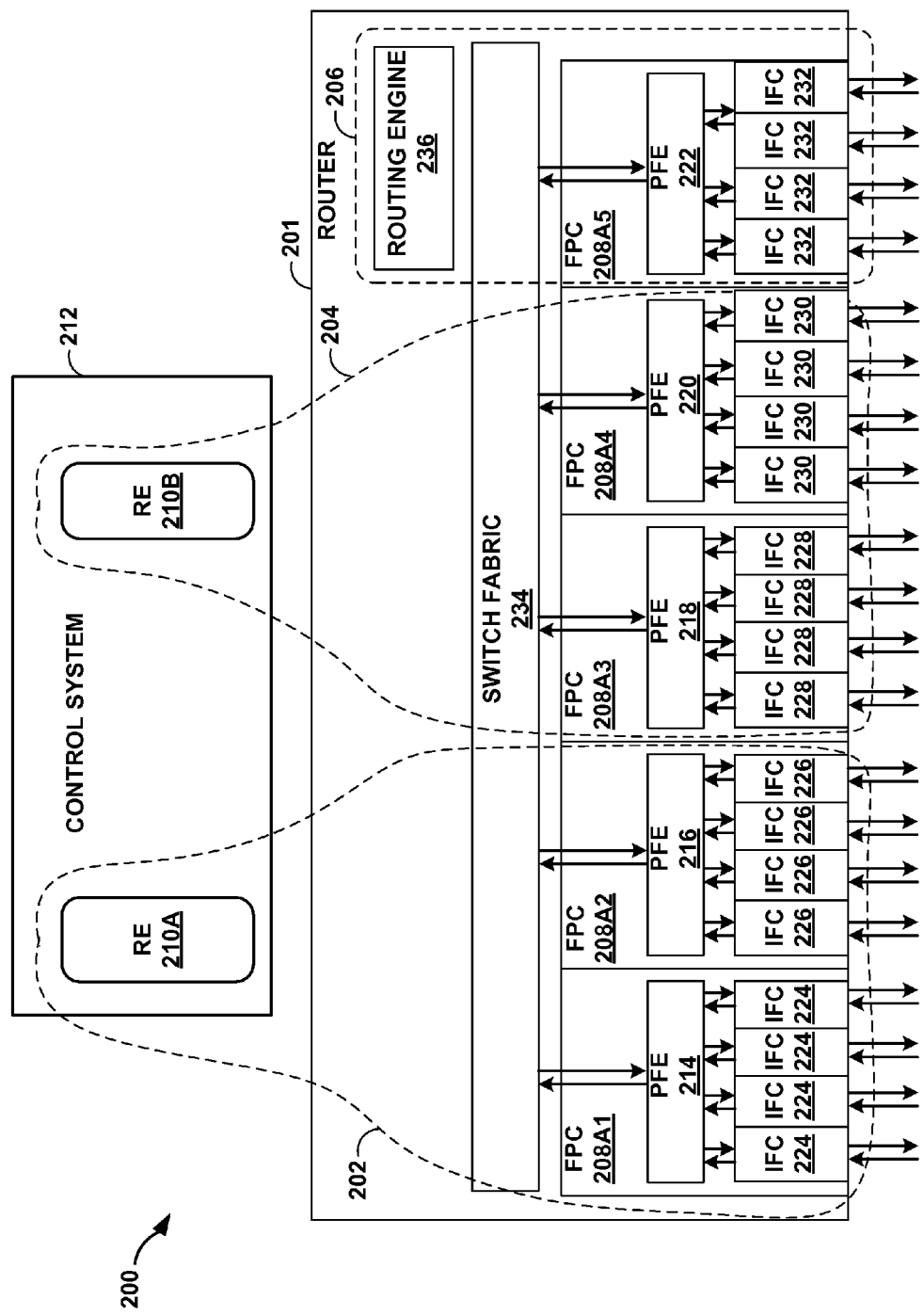
FIG. 9 is a block diagram illustrating in further detail an exemplary embodiment of a multi-router system according to one aspect of the disclosure.

FIG. 9 is a block diagram illustrating in further detail an exemplary embodiment of a multi-router system 200 according to one aspect of the disclosure. The techniques described above for orderly offlining of switch fabric components in a multi-stage switch fabric may be implemented in routing system 200 of FIG. 9. Routing system 200 routes data between network devices across a network. Routing system 200 may, for example, represent an illustration of routing system 6 of FIG. 1 in further detail.

In the example of FIG. 9, one or more standalone routers are physically coupled to a control system that provides a plurality of hardware-independent routing engines. The forwarding components (e.g., packet forwarding engines and interface cards) of the standalone router(s) are logically partitioned into multiple groups, and each group is assigned to a different one of the routing engines of the control system to form a separate "protected system domain" (PSD). Each of the PSDs operates and participates as a different standalone router within the network. Each of the PSDs, for example, participates in separate peering sessions with other routers to exchange routing information and maintain separate forwarding information. Each PSD thus provides the same "look and feel" of a physical router with its own dedicated resources and configuration data, and is administered as a separate router from other PSDs. The routing engine of the standalone router is referred to as a "root system domain" (RSD) and maintains control over any remaining forwarding components of the standalone router that are not assigned to either of PSDs.

FIG. 9 shows an example partitioning of a standalone router 201 into a first PSD 202, a second PSD 204 and a remaining RSD 206. In this example, router 201 includes five flexible packet interface card concentrators (FPCs) 208A1-208A5. PSD 202 is formed by assigning FPCs 208A1 and 208A2 to routing engine 210A of control system 212. In this way, PSD 202 has exclusive logical ownership of FPC 208A1, its packet forwarding engine (PFE) 214 and its interface cards IFCs 224. In addition, PSD 202 has exclusive logical ownership of FPC 208A2, packet PFE 216, and interface cards IFCs 226. In a similar manner, PSD 204 is formed by assigning FPCs 208A3 and 208A4 to routing engine 210B of control system 212, and PSD 204 has exclusive logical ownership of FPC 208A3, PFE 218, and IFCs 228, and FPC 208A4, PFE 220, and IFCs 230. Likewise, RSD 206 is formed by assigning FPC 208A5 to routing engine (RE) 236 of router 201. RSD 206 has exclusive logical ownership of FPC 208A5, PFE 222, and IFCs 232. Although PSDs 202, 204 are implemented on a partitioned standalone router 201, the PSDs 202, 204 are isolated from each other in terms of routing and forwarding components yet allow network interfaces to be shared between the PSDs 202, 204.

Router 201 also contains electronics for implementing an internal switch fabric 234 that provides a switching mechanism between the packet forwarding engines 214, 216, 218, 220, 222 of the FPCs 208A1-208A5 (FPCs 208A). For example, router 201 includes internal switch fabric 234 as a switching mechanism between interface cards of FPCs 208A. Switch fabric 234 may be implemented as a multi-stage switch fabric. The techniques described above for orderly offlining of switch fabric components in multi-stage switch fabric 234 may be implemented in routing system 200 of FIG. 9.

Routing system 200 may be a routing system such as routing system 6 of FIG. 1. Routing system 200 may exchange packets with border router 8 of public network 17 via link 10A. To edge routers 12 and border router 8 of network environment 2, PSDs 202, 204 may appear as separate routing devices within the topology of the network and are associated with separate network addresses. Nevertheless, as described herein, PSD logical routers 12 share the network interface coupled to link 10A. Further details of protected system domains may be found in application Ser. No. 12/618,536, entitled MULTI-ROUTER SYSTEM HAVING SHARED NETWORK INTERFACES, filed on Nov. 13, 2007, the entire contents of which are incorporated by reference herein.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transient, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method of offlining a switching component within a routing system having a switch fabric in which a set of distributed switching components provide a plurality of paths between a set of ingresses and a set of egresses of the switch fabric, the method comprising:

concurrently computing adjusted spray weights for each of the switching components positioned along multiple paths in an order from the switching component to be offlined to a plurality of the switching components coupled to the ingresses of the switch fabric, wherein the adjusted spray weights are respectively computed in order at each of the switching components along the respective path of the multiple paths, and wherein the adjusted spray weights control proportions of packets to be forwarded to outputs of the switching components;

applying the adjusted spray weights with the switching components along the multiple paths in a respective opposite order from the ingresses of the switch fabric to the switching component to be offlined; and switching packets through the switch fabric with the distributed switching components in accordance with the applied adjusted spray weights.

2. The method of claim 1, further comprising:

prior to concurrently computing the adjusted spray weights, receiving an indication of a planned offlining of the switching component to be offlined, wherein concurrently computing adjusted spray weights comprises concurrently computing the adjusted spray weights in response to receiving the indication of the planned offlining.

3. The method of claim 1, wherein the switching component being offlined comprises one of a fabric link, fabric chip, fabric card, fabric chassis, or fabric cable.

4. The method of claim 1, further comprising concurrently computing adjusted spray weights associated with multiple different switching components to be taken offline.

5. The method of claim 1, further comprising after applying the adjusted spray weights with all the switching components along the multiple paths from the ingresses of the switch fabric to the switching component to be offlined, offlining the switching component to be offlined.

6. The method of claim 1, wherein the switch fabric comprises a distributed, multi-stage switch fabric.

7. The method of claim 1, wherein the switch fabric comprises a distributed, multi-stage Clos switch fabric.

8. The method of claim 1, further comprising:

with a routing component of the routing system, sending a series of offlining prepare messages to a plurality of central processing units (CPUs) associated with the switching components positioned along the multiple paths, wherein each of the offlining prepare messages indicates that the CPU receiving the offlining prepare message should, based on the switching component to be offlined, compute the adjusted spray weights for the switching components and store the adjusted spray weights without applying the adjusted spray weights to traffic, and wherein concurrently computing adjusted spray weights for each of the switching components comprises one of the plurality of CPUs that receives one of the series of offlining prepare messages computing the adjusted spray weights upon receipt of the offlining prepare message.

9. The method of claim 8, wherein sending the series of offlining prepare messages comprises sending the series of offlining prepare messages in response to a determination that the switching component is to be offlined.

10. The method of claim 8, wherein the offlining prepare messages include information about adjusted spray weights computed by a downstream CPU, further comprising:

in response to one of the plurality CPUs receiving one of the series of offlining prepare messages, the one of the plurality of CPUs:

computing adjusted spray weights for switching components associated with the CPU based on the information about adjusted spray weights computed by a downstream CPU;

storing the computed adjusted spray weights for the switching components associated with the CPU without applying the adjusted spray weights to traffic; and sending a spray message to the routing component indicating the computed adjusted spray weights for the switching components associated with the CPU.

11. The method of claim 10, further comprising:

with the routing component, receiving the spray message; and concurrently outputting the spray message as an offlining prepare message to a plurality of switching components that lie upstream of the CPU along paths to different switch fabric ingresses, wherein the offlining prepare message includes an offline flag indicating that the offlining prepare message relates to an offlining operation.

12. The method of claim 8, further comprising:

prior to sending the series of offlining prepare messages, receiving an offline message from the one of the plurality of CPUs associated with the switching component to be offlined, wherein the offline message indicates the that the switching component is to be offlined, wherein sending the series of offlining prepare messages comprises sending the series of offlining prepare messages in response to receiving the offline message from the one of the plurality of CPUs associated with the switching component to be offlined.

13. The method of claim 8, wherein each of the offlining prepare messages includes a field specifying switching components along the path that the offlining prepare message has traversed from the switching component to be offlined.

14. The method of claim 9, wherein the field specifies identifiers of fabric chips of the switch fabric.

15. The method of claim 9, further comprising:

with the routing component, updating a message data structure, based on offline prepare messages and acknowledgement messages received from the CPUs, to indicate a status of an offline operation, wherein the message data structure includes entries associated with each of the different paths from switch fabric ingresses to the switching component to be offlined.

16. The method of claim 9, wherein the offlining prepare messages comprise out-of-band Ethernet messages.

17. The method of claim 1, further comprising:

with a routing component of the routing system, receiving at least one acknowledgement message from a ingress of the switch fabric that indicates that adjusted spray weights have been committed by the ingress of the switch fabric; and in response to receiving the acknowledgement message, sending a series of commit messages from the routing component to a plurality of central processing units (CPUs) associated with the switching components positioned along the multiple paths, wherein the commit messages indicate that the CPUs should apply the adjusted spray weights and begin switching packets in accordance with the applied adjusted spray weights, wherein applying the adjusted spray weights with the switching components along the multiple paths comprises applying the adjusted spray weights in response to receiving the series of commit messages.

18. The method of claim 17, further comprising:

with the routing component, receiving at least one acknowledgement message from an ingress of the switch fabric that indicates that adjusted spray weights have been committed by the ingress of the switch fabric; and sending the series of commit messages in response to receiving the acknowledgement message.

19. The method of claim 17, further comprising:
with one of the plurality of CPUs, receiving one of the series of commit messages from the routing component; and
sending an acknowledgement message from the one of the CPUs to the routing component that indicates that adjusted spray weights have been committed by the CPU.

20. The method of claim 19, further comprising:
receiving the acknowledgement message from the one of the CPUs; and
in response to receiving the acknowledgement message from the one of the plurality of CPUs, sending a commit message from the routing component to a CPU on a path to the switching component to be offlined.

21. The method of claim 20, further comprising:
wherein sending the commit message to the next CPU on the path comprises sending the commit message only after receiving acknowledgement messages from each of a plurality of CPUz positioned upstream of the next CPU.

22. A routing system comprising:
a switch fabric including a set of distributed switching components that provide a plurality of paths between a set of ingresses and a set of egresses of the switch fabric; and
a plurality of central processing units (CPUs), wherein each of the plurality of CPUs is associated with a respective plurality of the set of switching components,
wherein the CPUs concurrently compute adjusted spray weights for each of the switching components positioned along multiple paths in an order from the switching component to be offlined to a plurality of the switching components coupled to the ingresses of the switch fabric, wherein the adjusted spray weights are respectively computed in order at each of the switching components along the respective path of the multiple paths, and wherein the adjusted spray weights control proportions of packets to be forwarded to outputs of the switching components,
wherein the CPUs apply the adjusted spray weights with the switching components along the multiple paths in a respective opposite order from the ingresses of the switch fabric to the switching component to be offlined, and
wherein the distributed switching components switch packets through the switch fabric in accordance with the applied adjusted spray weights.

23. The routing system of claim 22, wherein the switch fabric comprises a distributed, multi-stage Clos switch fabric.

24. The routing system of claim 22, wherein the routing system comprises a multi-chassis router comprising a plurality of hierarchically arranged cooperative routing components operating as a single node within a network.

25. The routing system of claim 22, wherein the routing system comprises a multi-router system that includes one or more stand-alone routers that have been partitioned into multiple protected system domains (PSDs) that operate as independent logical routers.

26. The routing system of claim 22, wherein the plurality of CPUs concurrently compute adjusted spray weights associated with multiple different switching components to be taken offline.

27. The routing system of claim 22, wherein the switching component of the routing system to be offlined comprises one of a fabric link, fabric chip, fabric card, fabric chassis, or fabric cable.

28. The routing system of claim 22, further comprising:
a routing component in communication with each of the plurality of CPUs, wherein the routing component sends a series of offlining prepare messages to CPUs associated with the switching components positioned along the multiple paths, wherein the series of offlining prepare messages are sent in response to a determination that one of the plurality of switching components is to be offlined, wherein the plurality of distributed forwarding components lie along different paths within the switch fabric to different switch fabric ingresses, wherein each of the paths extends through the switch fabric from one of the switch fabric ingresses to a switching component to be offlined,
wherein each of the offlining prepare messages indicates that the CPU receiving the offlining prepare message should, based on the switching component to be offlined, compute the adjusted spray weights for the switching components and store the adjusted spray weights without applying the adjusted spray weights to traffic,
wherein one of the plurality of CPUs that receives one of the series of offlining prepare messages computes the adjusted spray weights upon receipt of the offlining prepare message.

29. The routing system of claim 28, wherein of the offlining prepare messages includes a field specifying fabric chips along the path that the offlining prepare message has traversed from the switching component to be offlined.

30. The routing system of claim 28,
wherein one of the plurality of CPUs associated with the switching component to be offlined sends a spray message to the routing component indicating the computed adjusted spray weights for the fabric links of the portion of the switch fabric associated with the distributed forwarding component, and
wherein the routing component receives the spray message and concurrently outputs the spray message as an offlining prepare message to a plurality of CPUs that lie upstream of the CPU associated with the switching component to be offlined along paths to different switch fabric egresses, wherein the offlining prepare message includes an offline flag indicating that the offlining prepare message relates to an offlining operation.

31. The routing system of claim 28,
wherein the routing component receives at least one acknowledgement message from a switch fabric ingress that indicates that adjusted spray weights have been committed by the switch fabric ingress, and, in response to receiving the acknowledgement message, sends a series of commit messages to the CPUs along each of the paths, wherein the commit messages indicate that the CPUs should apply the adjusted spray weights and begin forwarding traffic in accordance with the adjusted spray weights, and
wherein the CPUs apply the adjusted spray weights in response to receiving the commit messages.

32. The routing system of claim 31, wherein one of the plurality of distributed forwarding components receives one of the series of commit messages from the routing component, and sends an acknowledgement message from the one of the plurality of CPUs to the routing component that indicates that adjusted spray weights have been committed by the distributed forwarding component.

33. The routing system of claim 28, wherein the routing component updates a message data structure based on offline prepare messages and acknowledgement messages received from the CPUs, to indicate a status of an offline operation, wherein the message data structure includes entries associated with each of the different paths from switch fabric ingresses to the switching component to be offlined.

34. A non-transitory computer-readable storage medium of a routing system, the non-transitory computer-readable storage medium comprising instructions for causing a programmable processor to:

send a series of offlining prepare messages to a plurality of distributed forwarding components of the routing system, wherein the series of offlining prepare messages are sent in response to a determination that a switching component of the routing system is to be offlined, wherein the plurality of distributed forwarding components lie along different paths within a switch fabric of the routing system to different switch fabric ingresses, wherein each of the paths extends through the switch fabric from one of the switch fabric ingresses to the switching component to be offlined, wherein each of the offlining prepare messages indicates that the distributed forwarding component receiving the offlining prepare message should, based on the switching component to be offlined, compute adjusted spray weights for the distributed forwarding component and store the adjusted spray weights without applying the adjusted spray weights, wherein the spray weights control proportions of packets to be forwarded to outputs of the switching component; and send a series of commit messages from the routing component to the distributed forwarding components along each of the paths, wherein the commit messages indicate that the distributed forwarding components should apply the adjusted spray weights and begin forwarding traffic in accordance with the adjusted spray weights.

* * * * *